US 8,540,958 B2

(12) United States Patent
Nichol et al.

(10) Patent No.: US 8,540,958 B2
(45) Date of Patent: *Sep. 24, 2013

(54) CASCADING PURIFICATION

(75) Inventors: Scott Nichol, Toronto (CA); Anthony Tummillo, Toronto (CA); Dan Smith, Brampton (CA)

(73) Assignee: Silicor Materials Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,717

(22) Filed: Jun. 12, 2012

(65) Prior Publication Data

US 2012/0251425 A1    Oct. 4, 2012

Related U.S. Application Data

(63) Continuation of application No. 12/760,222, filed on Apr. 14, 2010, now Pat. No. 8,216,539.

(51) Int. Cl.
*C01B 33/02* (2006.01)

(52) U.S. Cl.
USPC .......................................................... 423/348

(58) Field of Classification Search
USPC ................................................. 423/348–350
See application file for complete search history.

(56) References Cited

U.S. PATENT DOCUMENTS

| 2,937,929 | A | 5/1960 | Voos |
| 2,972,521 | A | 2/1961 | Voos |
| 3,809,548 | A | 5/1974 | Spigerverk |
| 4,193,974 | A | 3/1980 | Kotval et al. |
| 4,193,975 | A | 3/1980 | Kotval et al. |
| 4,195,067 | A | 3/1980 | Kotval et al. |
| 4,312,847 | A | 1/1982 | Dawless |
| 4,312,849 | A | 1/1982 | Kramer |
| 4,588,571 | A | 5/1986 | Bildl |
| 4,822,585 | A | 4/1989 | Dawless |
| 2009/0130015 | A1 | 5/2009 | Saegusa et al. |
| 2010/0189622 | A1 | 7/2010 | Lan et al. |
| 2011/0044877 | A1 | 2/2011 | Turenne et al. |
| 2011/0256047 | A1 | 10/2011 | Nichol et al. |

FOREIGN PATENT DOCUMENTS

| CA | 2638998 A1 | 12/2009 |
| TW | 201202140 A | 1/2012 |
| WO | WO-2009012583 A1 | 1/2009 |
| WO | WO-2011127603 A1 | 10/2011 |

OTHER PUBLICATIONS

"U.S. Appl. No. 12/760,222 , Response filed Feb. 21, 2012 to Final Office Action mailed Dec. 21, 2011", 12 pgs.
"U.S. Appl. No. 12/760,222, Final Office Action Mailed Dec. 21, 2011", 6 pgs.
"U.S. Appl. No. 12/760,222, Non Final Office Action mailed Sep. 12, 2011", 10 pgs.
"U.S. Appl. No. 12/760,222, Notice of Allowance mailed Mar. 7, 2012", 5 pgs.
"U.S. Appl. No. 12/760,222, Response filed Nov. 22, 2011 to Non Final Office Action mailed Sep. 12, 2011", 13 pgs.
"International Application Serial No. PCT/CA2011/050196, International Search Report mailed Jul. 21, 2011", 5 pgs.
"International Application Serial. No. PCT/CA2011/050196, International Search Report mailed Jul. 21, 2011", 5 pgs.

*Primary Examiner* — Anthony J Zimmer
(74) *Attorney, Agent, or Firm* — Schwegman Lundberg & Woessner, P.A.

(57) ABSTRACT

The present invention provides a method of purifying a material using a cascading dissolution and washing process. The dissolution and washing processes can contain single or multiple stages. Water and dissolving chemicals are recycled through the process towards the beginning of the process.

21 Claims, 4 Drawing Sheets

US 8,540,958 B2

CASCADING PURIFICATION

CLAIM OF PRIORITY

This application is a continuation and claims the benefit of priority under 35 U.S.C. §120 to U.S. patent application Ser. No. 12/760,222, filed on Apr. 14, 2010, which is hereby incorporated by reference herein in its entirely.

BACKGROUND

The purification of materials is an important step in many commercial and industrial processes. The achievement of economical removal of impurities from a material, thereby increasing its purity, is a major goal in the optimization of these processes. However, efficient methods of separating impurities from a desired material, especially on a large-scale, are often both elusive and difficult to employ.

Crystallization of materials is one method used to remove undesired impurities. In a crystallization, a material with impurities is dissolved in a solvent and then caused to crystallize back out of the solution, forming a more pure form of the material. While crystallization can be an economical manner of purification, some materials do not cleanly crystallize out of a solvent, but rather crystallize first as the relatively pure desired material, and then upon those crystals a combination of the desired material and the impurities form. Sometimes this effect can be accentuated in situations where the yield of the crystalline desired product from the solution is attempted to be maximized. In other cases, inherent properties of the system of the solvent and the dissolved materials are such that cleanly stopping the crystallization before the undesired materials are deposited on the pure crystals is difficult or not possible.

Another (problem that can sometimes occur in using crystallization to purify a material is difficulty in separating pure crystals that have formed in the solution from the surrounding solution. In an ideal crystallization, as crystals grow out of a solution, the impurities are left behind in the solution, and the final step of purification is removal of the solution containing the impurities from the crystals. If the solvent is not entirely removed from the crystals, impurities can be left behind on the surface of the crystals. In cases where the solvent is a molten metal, solid solvent can be left behind on the surface of the crystals.

For example, when molten aluminum is used to crystallize the silicon flakes (crystals) are coated with an aluminum-silicon alloy after draining the mother liquor away from the flakes. To use these flakes for making further purified silicon, or to use these flakes directly, the aluminum-silicon alloy needs to be removed from the surface of the flakes and reduced as much as possible in the flakes. Crystallization is not in itself economically sufficient to bring the flakes to the desired level of purity, an additional means of purification is needed.

Therefore, there is a need for efficient large-scale purification methods of materials.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
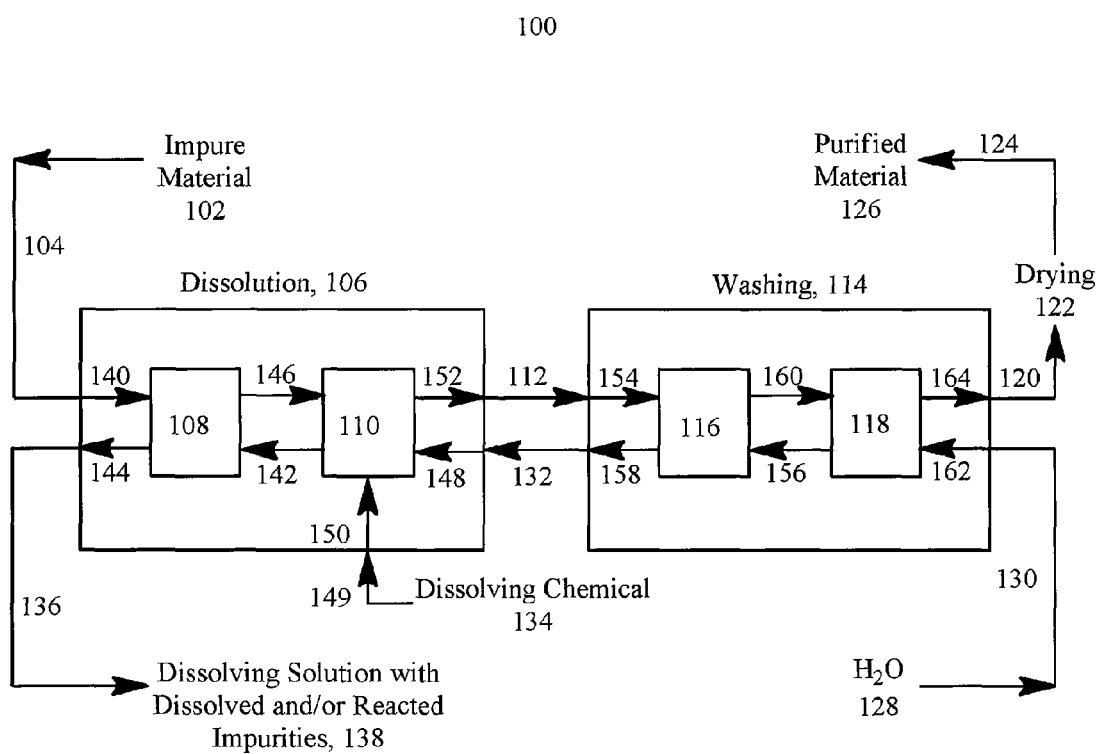
FIG. 1 shows a general flow diagram of a specific embodiment of the present invention.

The present invention provides a method of increasing the purity of a material using a cascading dissolving solution and washing process. The dissolving solution can react with or dissolve impurities in the material. The method includes combining an impure material with a dissolving solution. The combination is performed sufficiently to allow the impure material to react at least partially with the dissolving solution. The combination provides a third mixture. The method also provides separation of the third mixture. Separation of the third mixture provides an unwashed purified material and the dissolving solution. The method also includes combining the unwashed purified material and a rinse solution. The combination provides a fourth mixture. The method also includes separating the fourth mixture. Separation of the fourth mixture provides a wet purified material and the rinse solution. The method also includes removing portions of the dissolving solution. Portions of the dissolving solution are removed to maintain the pH, volume, concentration, or the specific gravity of the dissolving solution. The method also includes transferring portions of the rinse solution to the dissolving solution. Portions of the rinse solution are transferred to the dissolving solution to maintain the pH, volume, concentration, or the specific gravity of the dissolving solution. The method also includes adding portions of a bulk dissolving chemical to the dissolving solution. Portions of a bulk dissolving chemical are added to the dissolving solution to maintain the pH, volume, concentration, or the specific gravity of the dissolving solution. The method also includes adding fresh water to the rinse solution. Fresh water is added to the rinse solution to maintain the volume of the rinse solution.

The present invention provides a method of purifying silicon from a silicon-aluminum complex using a cascading dissolving solution and washing process. The dissolving solution can include acid solution. The dissolving solution can react with or dissolve impurities in the silicon, including aluminum. The method includes combining a first silicon-aluminum complex with a weak dissolving solution. The combination is performed sufficiently to allow the first complex to react at least partially with the weak dissolving solution. The combination provides a first mixture. The method also includes separating the first mixture. The separation of the first mixture provides a third silicon-aluminum complex and the weak dissolving solution. The method also includes combining the third silicon-aluminum complex with a strong dissolving solution. The combination is performed sufficiently to allow the third complex to react at least partially with the strong dissolving solution. The combination provides a third mixture. The method also includes separating the third mixture. The separation provides a first silicon and the strong dissolving solution. The method also includes combining the first silicon with a first rinse solution. The combination provides a fourth mixture. The method also includes separating the fourth mixture. The separation of the fourth mixture provides a wet purified silicon and the first rinse solution. The method also includes drying the wet purified silicon. The drying of the wet purified silicon provides a dry purified silicon.

The method includes combining a first silicon-aluminum complex with a weak dissolving solution. The combination is performed sufficiently to allow the first complex to react at least partially with the weak dissolving solution. The combination provides a first mixture. The method also includes separating the first mixture. The separation of the first mixture provides a second silicon-aluminum complex and the weak dissolving solution. The method also includes combining the second silicon-aluminum complex with a medium dissolving solution. The combination is performed sufficiently to allow the second complex to react at least partially with the medium dissolving solution. The combination provides a second mixture. The method also includes separating the second mixture. The separation of the second mixture provides a third silicon-aluminum complex and the medium dissolving solution. The method also includes combining the third silicon-aluminum complex with a strong dissolving solution. The combination is performed sufficiently to allow the third complex to react at least partially with the strong dissolving solution. The combination provides a third mixture. The method also includes separating the third mixture. The separation provides a first silicon and the strong dissolving solution. The method also includes combining the first silicon with a first rinse solution. The combination provides a fourth mixture. The method also includes separating the fourth mixture. The separation of the fourth mixture provides a second silicon and the first rinse solution. The method also includes combining the second silicon with a second rinse solution. The combination provides a fifth mixture. The method also includes separating the fifth mixture. The separation of the fifth mixture provides a wet purified silicon and the second rinse solution. The method also includes drying the wet purified silicon. The drying of the wet purified silicon provides a dry purified silicon.

The present invention also provides a method of purifying silicon from a silicon-aluminum complex using a cascading hydrochloric acid (HCl) solution and washing process. The method includes combining a first silicon-aluminum complex with a weak HCl solution. The combination is performed sufficiently to allow the first complex to react at least partially with the weak HCl solution. The combination provides a first mixture. The method also includes separating the first mixture. The separation of the first mixture provides a third silicon-aluminum complex and the weak HCl solution. The method also includes combining the third silicon-aluminum complex with a strong HCl solution. The combination is performed sufficiently to allow the third complex to react at least partially with the strong HCl solution. The combination provides a third mixture. The method also includes separating the third mixture. The separation provides a first silicon and the strong HCl solution. The method also includes combining the first silicon with a first rinse solution. The combination provides a fourth mixture. The method also includes separating the fourth mixture. The separation of the fourth mixture provides a wet purified silicon and the first rinse solution. The method also includes drying the wet purified silicon. The drying of the wet purified silicon provides a dry purified silicon. The method also includes removing portions of the weak HCl solution from the weak HCl solution. The portions of the weak HCl solution are removed to maintain the pH, volume, or specific gravity of the weak HCl solution. The method also includes transferring portions of strong HCl solution to the weak HCl solution. The portions of the strong HCl solution are transferred to maintain the pH, volume, or specific gravity of the weak HCl solution. The method also includes adding portions of a hulk HCl solution to the strong HCl solution. The portions of the bulk HCl solution are added to maintain the pH, volume, or specific gravity of the strong HCl solution. The method also includes transferring portions of the first rinse solution to the strong HCl solution. The portions of the first rinse solution are transferred to maintain the pH, volume, or specific gravity of the strong HCl solution. The method also includes adding fresh water to the first rinse solution. The fresh water is added to maintain the volume of the second rinse solution.

The present invention also provides a method of purifying silicon from a silicon-aluminum complex using a cascading hydrochloric acid (HCl) solution and washing process. The method includes combining a first silicon-aluminum complex with a weak HCl solution. The combination is performed sufficiently to allow the first complex to react at least partially with the weak HCl solution. The combination provides a first mixture. The method also includes separating the first mixture. The separation of the first mixture provides a second silicon-aluminum complex and the weak HCl solution. The method also includes combining the second silicon-aluminum complex with a medium HCl solution. The combination is performed sufficiently to allow the second complex to react at least partially with the medium HCl solution. The combination provides a second mixture. The method also includes separating the second mixture. The separation of the second mixture provides a third silicon-aluminum complex and the medium HCl solution. The method also includes combining the third silicon-aluminum complex with a strong HCl solution. The combination is performed sufficiently to allow the third complex to react at least partially with the strong HCl solution. The combination provides a third mixture. The method also includes separating the third mixture. The separation provides a first silicon and the strong HCl solution. The method also includes combining the first silicon with a first rinse solution. The combination provides a fourth mixture. The method also includes separating the fourth mixture. The separation of the fourth mixture provides a second silicon and the first rinse solution. The method also includes combining the second silicon with a second rinse solution. The combination provides a fifth mixture. The method also includes separating the fifth mixture. The separation of the fifth mixture provides a wet purified silicon and the second rinse solution. The method also includes drying the wet purified silicon. The drying of the wet purified silicon provides a dry purified silicon. The method also includes removing portions of the weak HCl solution from the weak HCl solution. The portions of the weak HCl solution are removed to maintain the pH, volume, or specific gravity of the weak HCl solution. The method also includes transferring portions of medium HCl solution to the weak HCl solution. The portions of the medium HCl solution are transferred to maintain the pH, volume, or specific gravity of the weak HCl solution. The method also includes transferring portions of strong HCl solution to the medium HCl solution. The portions of the medium HCl solution are transferred to maintain the pH, volume, or specific gravity of the medium HCl solution. The method also includes adding portions of a bulk HCl solution to the strong HCl solution. The portions of the bulk HCl solution are added to maintain the pH, volume, or specific gravity of the strong HCl solution. The method also includes transferring portions of the first rinse solution to the strong HCl solution. The portions of the first rinse solution are transferred to maintain the pH, volume, or specific gravity of the strong HCl solution. The method also includes transferring portions of the second rinse solution to the first rinse solution. The portions of the second rinse solution are transferred to maintain the volume of the first rinse solution. The method also includes adding fresh water to the second rinse solution. The fresh water is added to maintain the volume of the second rinse solution.

Embodiments of the present invention can have benefits and advantages over other methods. The dissolved or reacted impurities that exit the process can be sold as a value product. By cascading the material to be purified through a series of steps, a highly purified material can be generated by the method, which can provide a product of increased value over other methods. Recycling the dissolving chemical and the water backwards through the purification steps can save materials, reducing costs, and can reduce waste. By using cascading steps of dissolution beginning with the weakest dissolving mixture, exothermic chemical reaction or dissolution can be more easily controlled than in other methods.

DETAILED DESCRIPTION

Reference will now be made in detail to certain claims of the disclosed subject matter, examples of which are illustrated in the accompanying drawings. White the disclosed subject matter will be described in conjunction with the enumerated claims, it will be understood that they are not intended to limit the disclosed subject matter to those claims. On the contrary, the disclosed subject matter is intended to cover ail alternatives, modifications, and equivalents, which can be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a non-exclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The present invention relates to the efficient purification of materials. Specifically the present invention relates to using solubility or reactivity differences between a desired material and an undesired material to remove the undesired material, thus enhancing the purity of a desired material. More specifically, the present invention relates to a method of using a cascading process of subjecting a material to a dissolving solution that preferentially dissolves the impurities, followed by washing steps to remove the dissolving solution and the products of the reaction of the dissolving solution with the impurities, efficiently providing a purified material, wherein the water and dissolving solution used in the cascade are recycled towards the beginning of the process. The dissolving steps can optionally include a cascading sequence in which the material is subjected to stronger and stronger dissolving solutions, and the washing steps can also optionally include a cascading sequence in which the material is subjected to cleaner and cleaner rinsing solutions.

DEFINITIONS

As used herein, "acid solution" refers to a solution containing acid of any concentration.

As used herein, "aluminum trichloride" refers to $AlCl_3$.

As used herein, "batch" refers to a non-continuous production or use; something made or used in a single operation.

As used herein, "bins" refers to containers for holding, transporting, storing, or using materials. A bin need not have an unbroken solid body, a bin can have perforations or holes.

As used herein, "continuous" refers to non-batch production or use, an uninterrupted manufacture or use. A continuous process need not be infinitely continuous, but should be substantially continuous while the method containing the process is in operation.

As used herein, "crystal" refers to a solid having a highly regular structure. A crystal can be formed by the solidification of elements or molecules.

As used herein, "first complex", "second complex", and "third complex refers to a combination of more than one thing, particularly materials, compounds, or chemical elements. The complex can be macroscopic, e.g. the term does not require nor forbid the combination of chemical elements on a molecular or atomic scale. The complex can be of inconsistent distribution. The complex can be an alloy, or can contain an alloy.

As used herein, "dissolving chemical" refers to at least one dissolving chemical, and can refer to more than one dissolving chemical. Dissolving chemical can refer to a chemical that reacts with at least one impurity, dissolves at least one impurity, or a combination thereof.

As used herein, "dry" refers to at least partial removal of water, and can refer to something that has had a substantial majority of water removed from it.

As used herein, "extruded" refers to being squeezed or pushed out of a hole, including by the force of gravity, including by the force of liquid pressure caused by gravity, including a solid being pushed out of a hole by liquid pressure generated by the force of gravity or by other means.

As used herein, "fresh water" refers to water that has not yet been used to wash impurities or chemicals from a material to be purified.

As used herein, "HCl" refers to hydrochloric acid. Molecules of HCl can be mixed with any amount of water and still be referred to as HCl.

As used herein, "head space" refers to the volume of air above something, generally but not necessarily in an enclosed environment.

As used herein, "heater" refers to a device that can impart heat to something else.

As used herein, "material to be purified" can be at least one material, and can be several materials, and the several materials can be combined into alloys, chemical compounds, crystals, or combinations thereof.

As used herein, "mixture" refers to two or more things being combined. The combination can be such that intimate contact between the two things exists.

As used herein, "molten" refers to liquid, particularly the liquid of a material that is solid at room temperature.

As used herein, "peroxide" refers to a compound with an oxygen-oxygen single bond, and includes hydrogen peroxide.

As used herein, "pH" refers to a measure of the acidity or basicity of a solution. It approximates the negative base-ten logarithm of the molar concentration of dissolved hydrogen ions, i.e. $H^+$.

As used here, "polyaluminum chloride", also abbreviated as PAC, refers to a compound of the formula $Al_nCl_{(3n-m)}(OH)_m$. It can also be referred to as aluminum chlorohydrate.

As used herein, "react" refers to having a chemical reaction with, or dissolving.

As used herein, "sensor" refers to a device that can detect a characteristic or property of something else.

As used herein, "separation" or "separate" refers to the at east partial removal of one thing from another.

As used herein, the phrase "separating the mixture A, to provide solid B and liquid C" refers to separating B and C from mixture A. The phrase as used herein can also encompass one set of interposing steps of combining and separating, between the separating of mixture A and the providing of B and C, when specified. The phrase does not include interposing steps unless it is specified by dependant claim or otherwise specified. Specifically, "separating the mixture A, to provide solid B and liquid C" can mean separating solid D and liquid C from mixture A, combining D with liquid E to provide mixture F, and then separating mixture F to give solid B and liquid E. Thus, the separating of mixture A has provided solid B and liquid C, with one interposing set of the series of steps of combining and separating.

As used herein, "settling tank" refers to a tank designed to allow solid material settle to the bottom, so that liquid can be removed from the tank with less solid than it contained when it entered the tank. Settling tanks can be conical, and can have a valve at the bottom to allow the release of solids.

As used herein, "specific gravity" refers to the density of a substance relative to the density of water. Specific gravity can refer to the density of the substance being measured divided by the density of water measured at approximately 3.98 degrees C. and at one atmosphere pressure.

As used herein, "steam" refers to gaseous water or water vapors.

As used herein, "tank" refers to a container that can be but is not necessarily open at the top.

As used herein, "valve" refers to a device for allowing or stopping the flow of something through something else.

Referring to FIG. 1, a general flow diagram of a specific embodiment 100 of the present invention is shown. Impure material 102 can move through the process in the forward direction as water 128 and dissolving chemical 134 can move through the process in the opposite, or backwards, direction. Impure material 102 can enter the purification process 104 by beginning a dissolution phase 106. The dissolution phase 106 can include multiple cascading dissolution stages, including dissolution stage one 108 and dissolution stage two 110. The dissolution phase 106 can selectively dissolve or react with an impurity or impurities in the material to be purified. Next, the material to be purified can exit 112 the dissolution phase 106 and enter a washing phase 114. The washing phase 114 can include multiple cascading stages, including first washing stage 116 and second washing stage 118. The washed material can then exit 120 the washing phase and enter 120 a drying phase 122. After being dried, the material can exit 124 the drying phase 122, providing a dried purified material 126.

Although as described above the dissolution phase can include multiple cascading stages, the dissolution phase can alternatively include one dissolving stage. Rinse water from the washing phase and dissolving chemical can enter the single dissolving stage, such that the desired concentration of dissolving solution is formed. To maintain the pH, volume, concentration, or specific gravity of a single dissolving stage, the dissolving solution can be transferred completely or in portions out of the single dissolving stage and out of the dissolving phase. Impure material beginning the process can enter directly into the single dissolving stage. Additionally, more than two dissolving stages can alternatively be included in the dissolution phase. The last stage of the dissolution phase can generally be the phase in which rinse water from the washing phase and bulk dissolving chemical will be added to form the strong dissolving solution.

Although as described above the washing phase can include multiple cascading stages, the washing phase can alternatively include one washing stage. Fresh water can enter the single dissolving stage, and material to be washed from the dissolution phase can directly enter the single washing stage. After separation of the material and the rinse water in the single dissolving stage, the rinse water can directly enter the dissolution phase. Additionally, more than two washing stages can alternatively be included in the washing phase. The last stage of the dissolution phase can generally be the phase in which fresh water can be added.

The dissolution phase can selectively dissolve or react with multiple impurities as the material to be purified passes through the dissolution phase. Alternatively, the dissolution phase can selectively dissolve or react with one impurity as the material to be purified passes through the dissolution phase.

The drying can take place by any suitable manner known to those in the art. The drying can include drying by blowing air across the material, drawing air across a material such as by vacuum, the use of heating, centrifugal force, dipping or immersing in organic solvents miscible with water, shaking, allowing to drip-dry, or a combination thereof. Any suitable number of drying phases is encompassed within embodiments of the present invention.

Still referring to FIG. 1, as the material to be purified moves through the process in the forward direction, water 128 can enter 130 the end of the washing phase 114. Water can pass through the washing phase 114, removing dissolving chemical and the dissolved or reacted impurities from the purified material; thus, the water can exit 132 the washing stage 114 containing dissolving chemical and dissolved or reacted impurities. The water can enter 132 the end of the dissolution phase 106. In the dissolution phase 106, the water can be combined with bulk dissolving chemical 134 in an amount sufficient to generate a dissolving solution of the desired concentration. The dissolving solution can pass through the dissolution phase 106, becoming a progressively less strong dissolving solution as it dissolves and reacts with the impurities in the material to be purified. The dissolving solution can exit 136 the dissolution phase 106, providing a dissolving solution containing the dissolved and/or reacted impurities 138.

The dissolving chemical can be any suitable chemical known to those in the art. The dissolving chemical can include and acid, base, alcohol, or a combination thereof, and can include any suitable concentration of these chemicals in any suitable solvent. The dissolving chemical can include NaOH, KOH, $H_2O_2$, HCl, $H_2PO_4$, $H_2SO_4$, HF, $HNO_3$, HBr, $H_3PO_2$, $H_3PO_3$, $H_3PO_4$, $H_3PO_5$, $H_4P_2O_6$, $H_4P_2O_7$, $H_5P_3O_{10}$, or a combination thereof. At least one of the acid solutions can include a peroxide compound.

The impurities can be only dissolved in the dissolving chemical, and not reacted. Alternatively, the impurities can be only reacted by the dissolving chemical, and not dissolved. Alternatively, the impurities can be both dissolved and reacted with the dissolving chemical. Also, the impurities can be first dissolved, and then reacted with the dissolving chemical, such that the impurities do not appreciably react with the dissolving chemical prior to dissolution. Also, the impurities can be first reacted, and then dissolved with the dissolving chemical, such that the impurities do not appreciably dissolve prior reacting with the dissolving chemical. Reacting with the dissolving chemical can include transformation into a different compound or combination with a different element or compound. Thus, in situations where an impurity first is reacted prior to dissolution, possibly the dissolution can be characterized as dissolving a compound other than the impurity, due to the chemical transformation of the impurity prior to dissolution.

After impure material 102 enters 104 the dissolution phase 106, the material can enter 140 the first dissolution stage 108 and can be combined with a weaker dissolving solution to provide a mixture. The impure material and the dissolving solution can be allowed to mix for a sufficient time and at a sufficient temperature to allow at least partial dissolution or reaction of the dissolving solution with the impurities. The combination can be then separated, such that dissolving solution that contains the dissolved or reacted impurities can remain in the first dissolution stage 108 or can exit 144 the stage partially or completely, and material that has had at least some of its impurities reacted or dissolved away can exit 146 the first dissolution stage 108. Water from the wash phase can be added 148 in portions or completely to the second dissolution stage 110 and portions of dissolving chemical 134 can be added 149 to the dissolution phase, which can enter 150 the second dissolution stage 110, sufficient to generate a dissolving solution of the desired concentration in the second dissolving stage 110. The material to be purified can enter 146 the second dissolution stage 110 and combine with a stronger dissolving solution to provide a mixture. The impure material and the dissolving solution can be allowed to mix for a sufficient time and at a sufficient temperature to allow at least partial dissolution or reaction of the dissolving solution with the impurities. The combination can be then separated, such that dissolving solution that contains the dissolved or reacted impurities can remain in the second dissolution stage 110 or can exit 142 the stage partially or completely, and material that has had at least some of its impurities reacted or dissolved away can exit 152 the second dissolution stage 110, and subsequently can exit 112 the dissolution phase 106.

A sufficient time or a sufficient temperature as described above can include any suitable time or temperature as known to those of skill in the art. The sufficiency of time can be determined by the limitations of the physical process of combination as well as the reaction or dissolution time. The reaction or dissolution of the impurity with the dissolving solution can produce heat as an exothermic reaction or dissolution. Alternatively, the reaction of dissolution of the impurity with the dissolving solution can reduce heat as an endothermic reaction or dissolution. The heat generated or taken by a dissolution or reaction can be used in certain embodiments to help to control the sufficient temperature of the reaction. In other embodiments, the heat generated or taken by a dissolution or reaction can be counteracted by heating or refrigerating or other heat-controlling means to achieve the sufficient temperature. The sufficient time can sometimes be exceeded without negatively affecting the method. Likewise, a shorter time than a time adequate to completely, mostly, or more than at least partially dissolve or react with the impurity can be sometimes still be a sufficient time under the present invention. The temperature of the dissolution or reaction can affect the amount of time that is sufficient. Likewise, the amount of time used can affect the temperature that is deemed sufficient.

After the material enters 112 the washing phase 114, the material can enter 154 the first washing stage 116 and can be combined with rinse solution that contains some dissolving chemical and dissolved or reacted impurities. The material and the rinse solution can be allowed to mix for a sufficient time and at a sufficient temperature to allow at least some of the dissolved or reacted impurities or the dissolving chemical to enter the rinse solution. The combination can be then separated, such that rinse solution that contains the dissolved or reacted impurities or dissolving chemical can remain in the first washing stage 116 or can exit 158 partially or completely the first washing stage 116, and can subsequently partially or completely exit the washing phase 114. The material that has had some of the reacted or dissolved impurities or dissolving chemical washed away can exit 160 the first washing stage 116 and can enter 160 the second washing stage 118, where it can be combined with a second rinse solution that can be fed 162 by water entering 130 the washing phase 114 and subsequently entering 162 the second washing stage 118. The material and the rinse solution can be allowed to mix for a sufficient time and at a sufficient temperature to allow at least some of the dissolved or reacted impurities or the dissolving chemical to enter the rinse solution. The combination can then be separated, such that rinse solution that contains the dissolved or reacted impurities or dissolving chemical can remain in the second washing stage 118 or can exit 156 partially or completely the second washing stage 118, and material that has had some of the reacted or dissolved impurities or dissolving chemical washed away can exit 164 the second washing stage 118, and subsequently can exit 120 the dissolution phase 114.

In embodiments of the present invention, combining to form a mixture can occur by any suitable means known to those of skill in the art. Combining includes pouring, dipping, immersing, pouring two streams together, blending, or any other suitable means. Mixing in embodiments of the present invention can include mixing by any suitable means, including by agitation, stirring, injecting gases into the liquid to create stirring, dipping, tea-bagging, repeatedly tea-bagging, or by simply allowing the combined materials to sit together without any agitation, or with very slight agitation, or by any combination thereof. The agitation can be coincident with the combination means.

In embodiments of the present invention, combinations can be separated by any suitable means known to those of skill in the art, including decanting, filtering, or removing a perforated basket or bin containing a solid from a liquid-containing tank and allowing at least some of the liquid to drain back into the tank, or a combination thereof.

In embodiments of the present invention, the temperature of any stage of the process can be influenced by a heater or a cooler.

Figure 2:
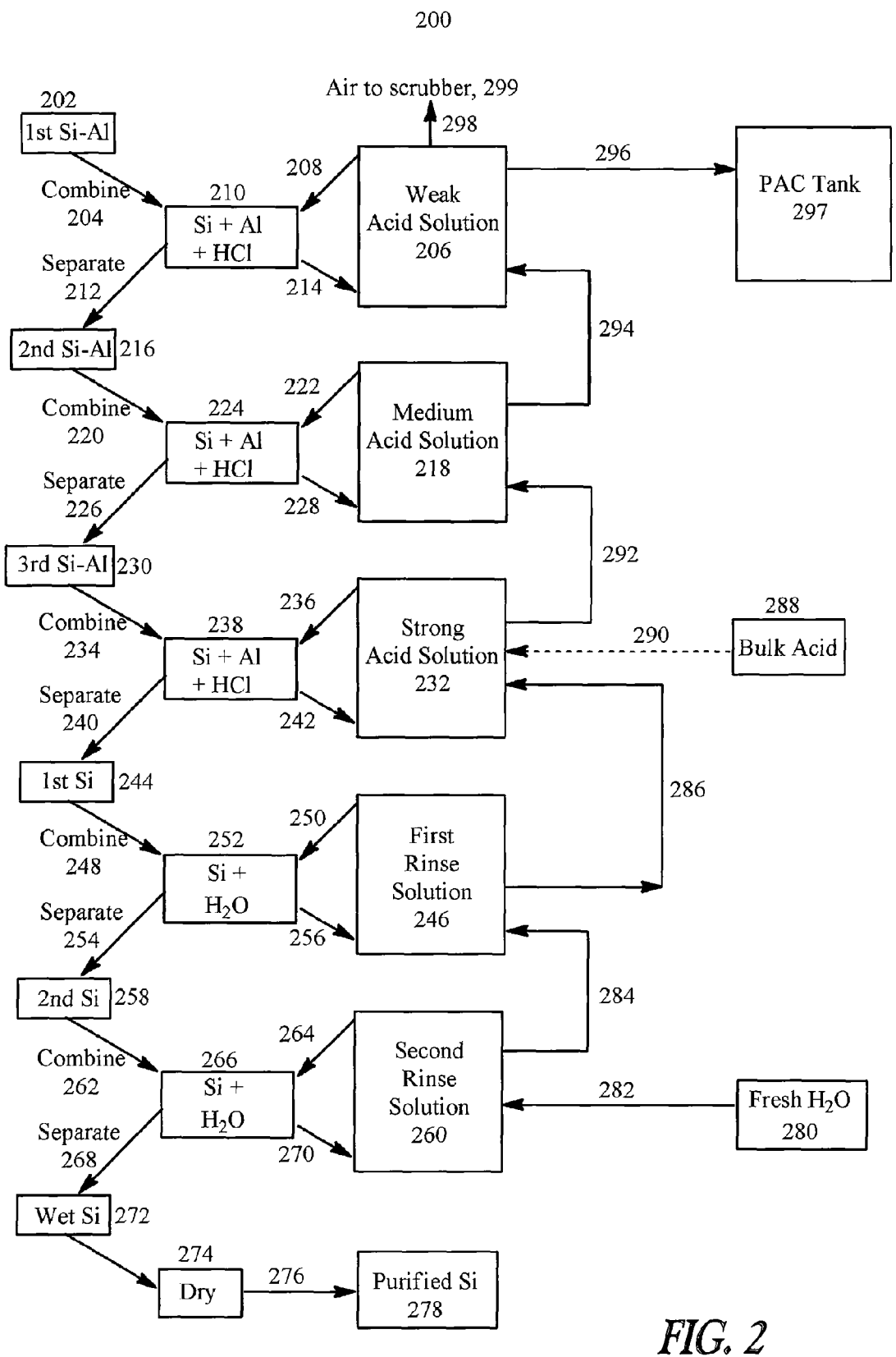
FIG. 2 shows a flow diagram of a method of purifying silicon in a specific embodiment of the present invention.

Referring to FIG. 2, a flow diagram of a method 200 for the purification of silicon in a specific embodiment of the present invention is shown. A first silicon-aluminum complex 202 and a weak acid solution 206 can be combined 204 and 208 to provide a first mixture 210. The first mixture 210 can be allowed to exist for sufficient time and at sufficient temperature such that the first complex 202 at least partially reacts with the weak acid solution 206, wherein reacting can include dissolving. The first mixture 210 can then be separated 212 and 214, providing a second silicon-aluminum complex 216 and the weak acid solution 206. Next, the second silicon-aluminum complex 216 and a medium acid solution 218 can be combined 220 and 222 to provide a second mixture 224. The second mixture 224 can be allowed to exist for sufficient time and at sufficient temperature such that the second complex 216 at least partially reacts with the medium acid solution 218, wherein reacting can include dissolving. The second mixture 224 can then be separated 226 and 228, providing a third silicon-aluminum complex 230 and the medium acid solution 218. Next, the third silicon-aluminum complex 230 and a strong acid solution 232 can be combined 234 and 236 to provide a third mixture 238. The third mixture 238 can be allowed to exist for sufficient time and at sufficient temperature such that the third complex 230 at least partially reacts with the strong acid solution 232, wherein reacting can include dissolving. The third mixture 238 can then be separated 240 and 242, providing a first silicon 244 and the strong acid solution 232. The first silicon 244 and a first rinse solution 246 can then be combined 248 and 250, providing a fourth mixture 252. The fourth mixture 252 can be allowed to exist for sufficient time and at sufficient temperature such that at least some of the dissolved or reacted impurities or acid solution that can be part of the first silicon 244 enters the first rinse solution 246. The fourth mixture 252 can then be separated 254 and 256, providing a second silicon 258 and the first rinse solution 246. The second silicon 258 and a second rinse solution 260 can be then combined 262 and 264, providing a fifth mixture 266. The fifth mixture 266 can be allowed to exist for sufficient time and at sufficient temperature such that at least some of the dissolved or reacted impurities or acid solution that can be part of the second silicon 258 enters the second rinse solution 260. The fifth mixture 266 can then be separated 268 and 270, providing a wet purified silicon 272 and the second rinse solution 260. The wet purified silicon can then be dried 274, sufficient to provide 276 a purified silicon 278.

One skilled in the art will recognize that the preceding discussion of FIG. 1 including that regarding single or multiple stages, multiple or single impurities, drying methods, dissolving or reacting in any order, sufficient time and temperature, and separation, applies equally to the embodiment depicted in FIG. 2.

Although the embodiment described above has three dissolving stages in the dissolution phase, embodiments of the present invention also encompass dissolution phases with only one or with any suitable number of dissolving stages. Also, although the embodiment described above has two washing stages in the washing phase, embodiments of the present invention also encompass washing phases with only one or with any suitable number of washing stages. Likewise, although the embodiment described above has one drying phase, embodiment of the present invention also encompass any suitable number of drying phases.

The silicon-aluminum complex can include silicon crystals, and an alloy of silicon and aluminum. The silicon-aluminum complex can be created by crystallizing silicon from molten aluminum, from another solvent, or by other means. At least one of a series of steps of combining to provide a mixture and then separating can provide a more pure silicon or silicon-aluminum complex than the silicon or silicon-aluminum complex that went into the series of steps. At least one of a series of steps of combining with acid solution to provide a mixture and then separating can provide a silicon with less aluminum than the silicon-aluminum complex that went into the series of steps.

Still referring to the specific embodiment depicted in FIG. 2, fresh water 280 can be added 282 to the second rinse solution 260 to maintain the volume of the second rinse solution 260. Portions of the second rinse solution 260 can be transferred 284 to the first rinse solution 246 to maintain the volume of the first rinse solution 246. Portions of the first rinse solution 246 can be transferred 286 to the strong acid solution 232 to maintain the pH of the strong acid solution 232, to maintain the volume of the strong acid solution 232, to maintain the specific gravity of the strong acid solution 232, or a combination thereof. Portions of a bulk acid solution 288 can be added 290 to the strong acid solution 232 to maintain the pH of the strong acid solution 232, to maintain the volume of the strong acid solution 232, to maintain the specific gravity of the strong acid solution 232, or a combination thereof. The bulk acid solution can be, for example, HCl. The bulk acid solution can be 32% HCl. The bulk acid solution can be any suitable concentration of acid. The strong acid solution 232 can have, for example, a pH of between approximately −0.5 and 0.0, and a specific gravity of approximately 1.01-1.15. Portions of the strong acid solution 232 can be transferred 292 to the medium acid solution 218 to maintain the pH of the medium acid solution 218, to maintain the volume of the medium acid solution 218, to maintain the specific gravity of the medium acid solution 218, or a combination thereof. The medium acid solution can have, for example, a pH of between approximately 0.0 and 3.0, and a specific gravity of approximately 1.05-1.3. Portions of the medium acid solution 218 can be transferred 294 to the weak acid solution 206 to maintain the pH of the weak acid solution 206, to maintain the volume of the weak acid solution 206, to maintain the specific gravity of the weak acid solution 206, or a combination thereof. Portions of the weak acid solution 206 can be removed 296 to maintain the pH and specific gravity of the weak acid solution 206. The weak acid solution 206 can have, for example, a pH of between approximately 1.0 and 3.0, and a specific gravity of approximately 1.2-1.4. The removed portions of the weak acid solution 206 can be transferred. 296 to a polyaluminum chloride tank 297. The polyaluminum chloride tank 297 can have, for example, a pH between approximately 1.5 and 2.5, and a specific gravity of approximately 1.3. The PAC tank 297 can also have, for example, a specific gravity of approximately 1.2-1.4. Gas from above the weak acid solution, which can include hydrogen ($H_2$), steam, and acid gas such as for example HCl gas, can be transferred 298 to a scrubber 299 to remove impurities before releasing into the environment. The head space above at least one of the medium acid solution, the strong acid solution, or the rinse solutions can be connected to the head space above the weak acid solution, such that the gas removed from the head space of the weak acid solution includes steam or gas originated from the weak acid solution and at least one of the medium acid solution, the strong acid solution, or the first or second rinse solutions.

Embodiments of the present invention encompass optionally transferring portions of fresh water or rinse water from any rinse stage to any solution to maintain or adjust the pH, volume, or specific gravity of that solution. Although specific examples are given herein for the pH and specific gravity of three acid tanks in a three stage acid wash, and for the PAC tank, it is to be understood that the range and values of the pH and specific gravity can significantly from these examples and still be encompassed as an embodiment of the present invention. Likewise, the labels "strong", "medium", and "weak" are intended to indicate the relationship between the strength of the acid solutions, rather than to limit any particular acid solution to a particular value or range of pH or specific gravity. Thus, in an embodiment with two acid wash stages, in which the acid solutions are labeled "weak" and "strong", both acid solutions could be characterized as strong acid solutions, although the relationship between the acid solutions is such that one acid solution ("strong") is stronger than the other ("weak"). Likewise, in an embodiment with two acid wash stages, in which the acid solutions are labeled "weak" and "strong", both acid solutions could be characterized as weak or medium strength acid solutions, although the relationship between the acid solutions is such that one acid solution ("weak") is weaker than the other ("strong").

The silicon and the rinse solutions can be allowed to mix for approximately 24 hours prior to the separation step. The silicon and the rinse solutions can be allowed to mix for approximately 1 hour prior to the separation step. The drying step can be conducted from at least 3 hours. The times of the steps of the present invention can include any suitable times.

At least one of the acid solutions, mixtures, and rinse solutions can be in tanks. The silicon-aluminum complexes, the first and second silicons, and the wet and dry purified silicon can be transferred from tanks using temperature- and chemical-resistant bins that have holes to allow fluids into and out of the bins. The bins can be drained during separation. At least one acid solution tank can hold two bins. At least one tank in which a series of steps of combining and separating occurs can be positioned such that when the contents reach a certain height they overflow into a tank in which an earlier series of steps of combining and separating occur. A tank that includes both an overflow outlet and inlet can have the overflow outlet and inlet positioned on opposite sides of the tank. At least one of the acid solutions, mixtures, and rinse solutions can be in settling tanks. Solids can be removed from settling tanks. Removal of solids can include opening a valve at the bottom of a tank to allow solids to be extruded from the bottom of a tank. Removal of solids can include draining the liquid from the tank and manually or mechanically removing the solids from the bottom of the tank.

As well as encompassing the use of one tank per cascading step, embodiments of the present invention encompass the use of a single tank for the entire process, and the use of less tanks than there are steps in the cascade. For example, one tank could be used for multiple acid dissolution steps, and then one tank could be used for the rinse steps. For example, two tanks could be used for multiple acid dissolution steps, and two tanks could be used for the rinse steps. Another example includes the use of one tank for one or more acid dissolution steps, and the use of the same tank for one or more rinse steps. The acid solutions and the rinse solutions can be added to a tank holding silicon-aluminum complexes or silicon for rinsing. Once the acid dissolution or rinse step is complete, the solution can be removed from the tank and moved to a storage location or discarded, and the next solution can be added to the tank to begin the next cascading step. One or more tank that holds the flakes can be a settling tank. The maintaining of the pH, specific gravity, and volume of the solutions can occur in the one or more tanks that holds the flakes, in the storage location for each particular solution, or both. The silicon-aluminum complexes, the first and second silicons, and the wet and dry purified silicon can be held in one or more particular tanks in any suitable manner, including using temperature- and chemical-resistant bins that have holes to allow fluids into and out of the bins. The bins can be drained during separation, either white inside the tank when the solution is transferred out, or by lifting the bin out of the tank to allow the solution inside the bin to flow back into the tank. A tank can hold two bins, or any suitable number of bins, including one bin. The storage location of at least one of the acid solutions, mixtures, or rinse solutions can be a settling tank. Solids can be removed from settling tanks. Removal of solids can include opening a valve at the bottom of a tank to allow solids to be extruded from the bottom of a tank. Removal of solids can include draining the liquid from the tank and manually or mechanically removing the solids from the bottom of the tank.

At least one of a series of steps of combining with a rinse solution to provide a mixture and then separating can provide a silicon with less product of the reaction of the acid solution and aluminum than the silicon that went into the series of steps.

The dry purified silicon can have approximately 1000-3000 parts per million weight aluminum. At least one of the first, second, or third silicon-aluminum complex, the first or second silicons, the wet silicon, or the dry purified silicon can be independently approximately 400 to 1000 kg. At least one of the first, second, or third silicon-aluminum complex, the first or second silicons, the wet silicon, or the dry purified silicon can be independently approximately 600 to 800 kg. At least one of the first, second, or third silicon-aluminum complex, the first or second silicons, the wet silicon, or the dry purified silicon can be independently approximately 650 to 750 kg.

The specific ranges of pH and specific gravity described above are one or more specific embodiments of the present invention. Embodiments of the present invention encompass any suitable range of pH or specific gravity for the various stages of the method. For example, in a three step acid dissolution, the strong acid solution can have a pH of approximately −0.5 to 4, the medium acid solution can have a pH of approximately 0.0 to 4, and the weak acid solution can have a pH of approximately 0.0 to 5. In another example, the strong acid solution can have a pH of approximately −0.5 to 1, the medium acid solution can have a pH of approximately 0.0 to 3, and the weak acid solution can have a pH of approximately 1.0 to 4.0. In another example, the strong acid solution can have a pH of approximately −0.5 to 0.0, the medium acid solution can have a pH of approximately 0.0 to 2.5, and the weak acid solution can have a pH of approximately 1.5 to 3.0. In another example, in a two stage acid dissolution, the strong acid solution can have a pH of approximately −0.5 to 4, and the weak acid can have a pH of approximately 0.0 to 5. In another example, with a two stage acid dissolution, the strong acid solution can have a pH of approximately −0.5 to 3, and the weak acid solution can have a pH of approximately 0.0 to 4. In another example, with a two stage acid dissolution, the strong acid solution can have a pH of approximately −0.5 to 1.0, and the weak acid solution can have a pH of approximately 1.0 to 3.0. All suitable variations of pH that maintain the relationship between stronger and weaker solutions are envisioned to be encompassed by embodiments of the present invention.

Likewise, for example, in a three step acid wash, the strong acid solution can have a specific gravity of approximately 1.01 to 1.4, the medium acid solution can have a specific gravity of approximately 1.01-1.4, and the weak acid solution can have a specific gravity of approximately 1.01-1.4. In another example, the strong acid solution can have a specific gravity of approximately 1.01-1.3, the medium acid solution can have a specific gravity of approximately 1.01-1.2, and the weak acid solution can have a specific gravity of approximately 1.1-1.4. In another example, the strong acid solution can have a specific gravity of approximately 1.01-1.10, the medium acid solution can have a specific gravity of approximately 1.05-1.15, and the weak acid solution can have a specific gravity of approximately 1.2-1.4. In another example, the strong acid solution can have a specific gravity of approximately 1.05, the medium acid solution can have a specific gravity of approximately 1.09, and the weak acid solution can have a specific gravity of approximately 1.3. In another example, with a two stage acid dissolution, the strong acid solution can have a specific gravity of approximately 1.01-1.4, and the weak acid solution can have a specific gravity of approximately 1.01-1.4, In another example, with a two stage acid dissolution, the strong acid solution can have a specific gravity of approximately 1.01-1.3, and the weak acid solution can have a specific gravity of approximately 1.01-1.4. In another example, with a two stage acid dissolution, the strong acid solution can have a specific gravity of approximately 1.01-1.2, and the weak acid solution can have a specific gravity of approximately 1.1-1.4. All suitable variations of specific gravity are envisioned to be encompassed by embodiments of the present invention.

The removing of portions to maintain pH, volume, specific gravity, or a combination thereof of any step individually can be conducted as a batch process or as a continuous process. Sensors can be used to detect at least one of a liquid height, a pH, a specific gravity, a flow rate, a temperature, or a combination thereof. Any suitable sensor device useful for detecting any characteristic of the solutions suitable for allowing adjustment of their properties by the methods of the present invention are included within embodiments of the present invention. Sensors suitable for use in a continuous process can differ from those suitable for use in a batch process.

The use of the word "portion" is not intended in any way to limit the scope of the embodiments of the present invention to batch processes. Moreover, infinitely small portions can be continuously removed in a continuous process; thus, the word "portion" does not limit the present invention to batch processes.

The removed portions of the weak acid can include polyaluminum chloride. The removed portions of the weak acid can include aluminum trichloride. The removed portions of the weak acid solution can include a product of the reaction of aluminum with HCl, water, or a combination thereof. The first polyaluminum chloride tank can include a settling tank. Portions of the contents of the polyaluminum chloride tank can be transferred from the top of the tank to the middle of another polyaluminum chloride tank, wherein the next polyaluminum chloride tank includes a settling tank. The steps of transferring liquid from the top of a settling tank to the middle of another settling tank can be repeated using a sequence of settling tanks until the liquid from the last settling tank in a sequence of settling tanks is sufficiently free of solid material. The steps of transferring liquid from the top of a settling tank to the middle of another settling tank can be repeated using a sequence of settling tanks until the liquid from the last settling tank in a sequence of settling tanks is sufficiently free of solid material to be used in a water purification process.

Figure 3:
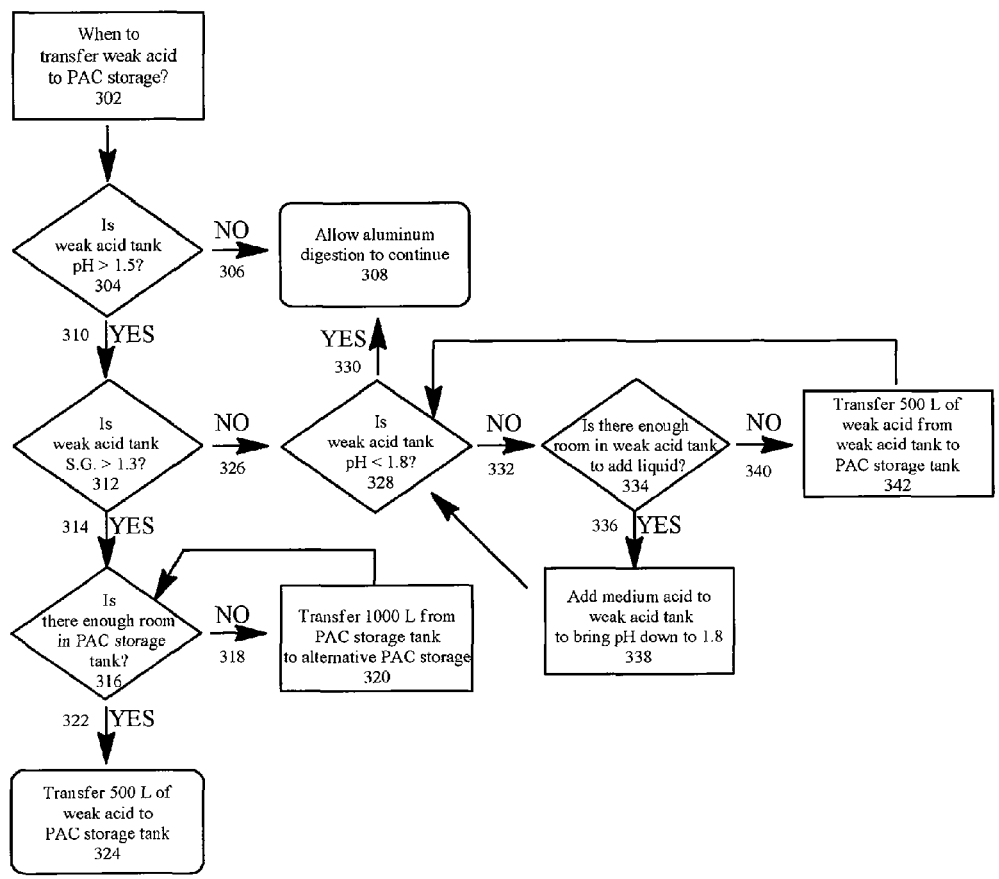
FIG. 3 shows a decision tree describing when to remove portions of the weak acid solution in a specific embodiment of the present invention.

Referring to FIG. 3, a decision tree 300 describes when to remove portions of the weak acid solution in a specific embodiment of the present invention. A query can be made of when to transfer portions of the weak acid to a polyaluminum chloride tank. First, if the answer to the query 304 of whether the weak acid tank has a pH of greater than 1.5 is negative, 306, then aluminum dissolution or reaction can be allowed to continue in the weak acid tank, 308; if the answer is affirmative, 310, then the value of the specific gravity of the weak acid tank is queried, 312. If the answer to the query 312 of whether the weak acid tank has a pH of greater than 1.3 is affirmative, 314, then the remaining space in the PAC tank is queried 316. If the answer to the query 316 of whether there is adequate space in the PAC storage tank is negative, 318, then 1000 L can be transferred from the PAC storage tank to an alternative PAC storage tank 320 and the remaining space in the PAC tank can then be re-queried 316. If the answer to the query 316 of whether there is adequate space in the PAC storage tank is affirmative, 322, then 500 L of weak acid can be transferred to a PAC storage tank, 324. If the answer to the query 312 of whether the weak acid tank has a pH of greater than 1.3 is negative, 326, then the pH of the weak acid tank can be queried, 328. If the answer to the query 328 of whether the pH of the weak acid tank is below 1.8 is affirmative, 330, then aluminum dissolution or reaction can be allowed to continue in the weak acid tank, 308; if the answer is negative, 332, then the remaining space in the weak acid tank can be queried 334. If the answer to the query 334 of whether there is enough room in the weak acid tank to add liquid is affirmative, 336, then portions of the medium acid can be added to the weak acid to bring the pH down to 1.8, and the pH of the weak acid tank is re-queried 328. If the answer to the query 334 of whether there is enough room in the weak acid tank to add liquid is negative, 340, then 500 L of weak acid can be transferred from the weak acid tank to the PAC storage tank, 342, and the pH of the weak acid tank can be re-queried, 328. After reaching decision 308 to allow aluminum digestion to continue, or reaching decision 324 to transfer 500 L of weak acid to the PAC storage tank, the decision tree is restarted with query 302. Generally, when action 342 of transferring 500 L of weak acid from the weak acid tank to the PAC storage tank is reached in the decision tree, the quality of the PAC solution can be lowered. Generally, when action 324 of transferring 500 L of weak acid to the PAC storage tank is reached in the decision tree, the quality of the PAC solution can be improved. However, embodiments of the present invention encompass methods that generate tower quality PAC solution as well as high quality PAC solution. It is to be understood that in an embodiment of the invention with two acid wash steps, decision box 338 would instruct to add strong acid solution to the weak acid tank to bring the down to 1.8.

One of ordinary skill in the art will appreciate that the series of steps shown in the decision tree illustrated in FIG. 3 are not limited to the specific pH levels or transferred volumes given as examples in the Figure. The pH levels used to make decisions, or the respective volumes that are transferred, can vary significantly from the specific examples given and still be encompassed by embodiments of the present invention. For example, decision box 304 can query whether the pH of the weak acid tank is over approximately 1.0. In another example, decision box 304 can query whether the pH of the weak acid tank is over approximately 1.3. In another example, decision box 304 can query whether the pH of the weak acid tank is over approximately 1.8. In another example, decision box 312 can query whether the specific gravity of the weak acid tank is greater than approximately 1.1. In another example, decision box 312 can query whether the specific gravity of the weak acid tank is greater than approximately 1.2. In another example, decision box 312 can query whether the specific gravity of the weak acid tank is greater than approximately 1.4. In another example, decision box 328 can query whether the weak acid tank has a pH of less than approximately 1.6. In another example, decision box 328 can query whether the pH of the weak acid tank has a pH of less than approximately 1.7. In another example, decision box 328 can query whether the pH of the weak acid tank has a pH of less than approximately 2.0. In another example, decision box 338 can add solution until the pH of the weak acid solution reaches approximately 1.6. In another example, decision box 338 can add solution until the pH of the weak acid solution reaches approximately 1.7. In another example, decision box 338 can add solution until the pH of the weak acid solution reaches approximately 2.0. In another example, the volume transferred in decision boxes 342 or 324 can be approximately 250 L. In another example the volume transferred in decision boxes 342 or 324 can be approximately 750 L. In another example, the volume transferred in decision boxes 342 or 324 can be approximately 1000 L. In another example, the volume transferred in decision box 320 can be approximately 750 L. In another example, the volume transferred in decision box 320 can be approximately 1250 L. All suitable variations of pH and volume transferred are envisioned to be encompassed by embodiments of the present invention.

The polyaluminum chloride tank described above can contain any suitable material, and is not limited to only polyaluminum chloride solution.

Figure 4:
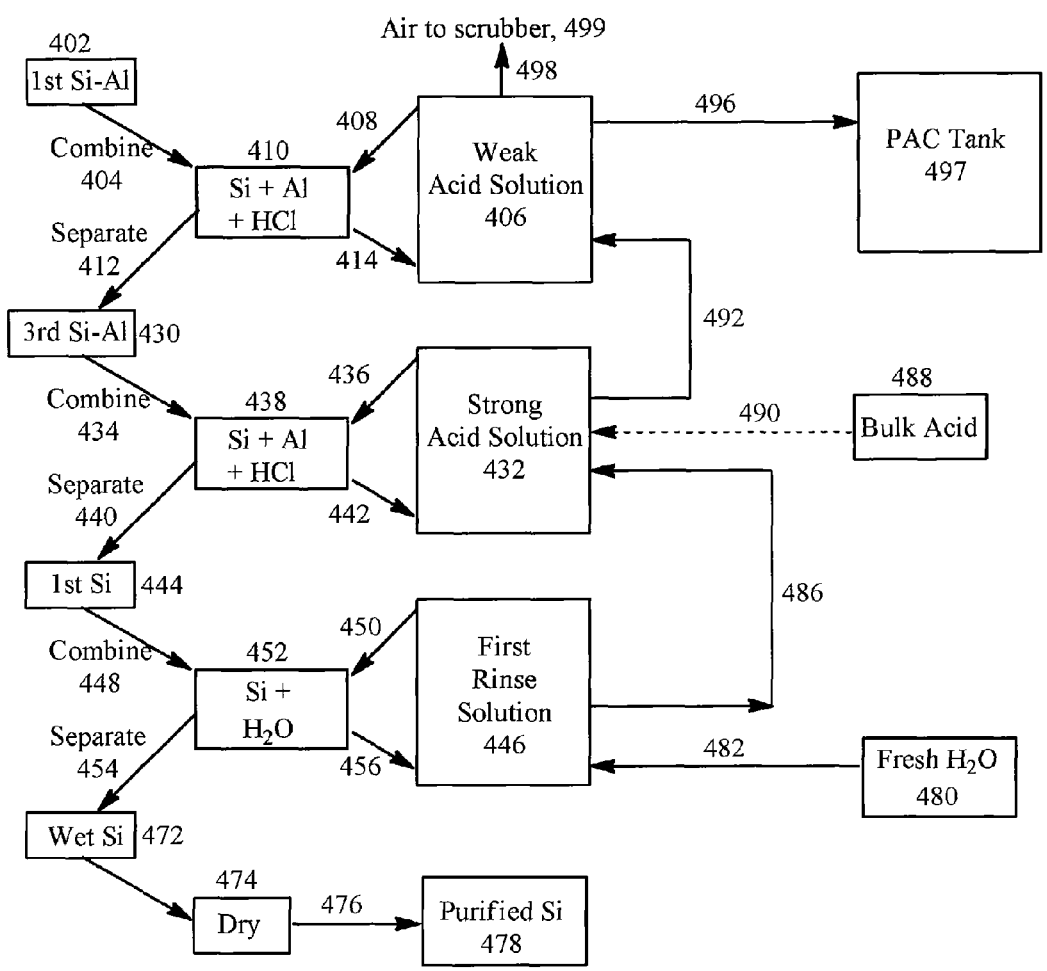
FIG. 4 shows a flow diagram of a method of purifying silicon in a specific embodiment of the present invention.

Referring to FIG. 4, a flow diagram of a method 400 for the purification of silicon in a specific embodiment of the present invention is shown. A first silicon-aluminum complex 402 and a weak acid solution 406 can be combined 404 and 408 to provide a first mixture 410. The first mixture 410 can be allowed to exist for sufficient time and at sufficient temperature such that the first complex 402 at least partially reacts with the weak acid solution 406, wherein reacting can include dissolving. The first mixture 410 can then be separated 412 and 414 (with the possible interposing steps of combining and separating), providing a third silicon-aluminum complex 430 and the weak acid solution 406. Next, the third silicon-aluminum complex 430 and a strong acid solution 432 can be combined 434 and 436 to provide a third mixture 438. The third mixture 438 can be allowed to exist for sufficient time and at sufficient temperature such that the third complex 430 at least partially reacts with the strong acid solution 432, wherein reacting can include dissolving. The third mixture 438 can then be separated 440 and 442, providing a first silicon 444 and the strong acid solution 432. The first silicon 444 and a first rinse solution 446 can then be combined 448 and 450, providing a fourth mixture 452. The fourth mixture 452 can be allowed to exist for sufficient time and at sufficient temperature such that at least some of the dissolved or reacted impurities or acid solution that can be part of the first silicon 444 enters the first rinse solution 446. The fourth mixture 452 can then be separated 454 and 456 (with the possible interposing steps of combing and separating), providing a wet purified silicon 472 and the first rinse solution 460. The wet purified silicon can then be dried 474, sufficient to provide 476 a purified silicon 478.

One skilled in the art will recognize that the preceding discussion of FIG. 1 including that regarding single or multiple stages, multiple or single impurities, drying methods, dissolving or reacting in any order, sufficient time and temperature, and separation, applies equally to the embodiment depicted in FIG. 4.

Although the embodiment described above has two dissolving stages in the dissolution phase, embodiments of the present invention also encompass dissolution phases with only one or with any suitable number of dissolving stages, e.g., one, two, three, four, or five dissolving stages. Also, although the embodiment described above has one washing stage in the washing phase, embodiments of the present invention also encompass washing phases with any suitable number of washing stages, e.g., one, two, three, four, or five rinse stages. Likewise, although the embodiment described above has one drying phase, embodiment of the present invention also encompass any suitable number of drying phases.

The silicon-aluminum complex can include silicon crystals, and an alloy of silicon and aluminum. The silicon-aluminum complex can be created by crystallizing silicon from molten aluminum, from another solvent, or by other means. At least one of a series of steps of combining to provide a mixture and then separating can provide a more pure silicon or silicon-aluminum complex than the silicon or silicon-aluminum complex that went into the series of steps. At least one of a series of steps of combining with acid solution to provide a mixture and then separating can provide a silicon with less aluminum than the silicon-aluminum complex that went into the series of steps.

Still referring to the specific embodiment depicted in FIG. 4, fresh water 480 can be added 482 to the first rinse solution 460 to maintain the volume of the first rinse solution 460. Portions of the first rinse solution 446 can be transferred 486 to the strong acid solution 432 to maintain the pH of the strong acid solution 432, to maintain the volume of the strong acid solution 432, to maintain the specific gravity of the strong acid solution 432, or a combination thereof. Portions of a bulk acid solution 488 can be added 490 to the strong acid solution 432 to maintain the pH of the strong acid solution 432, to maintain the volume of the strong acid solution 432, to maintain the specific gravity of the strong acid solution 432, or a combination thereof. The bulk acid solution can be, for example, HCl. The bulk acid solution can be 32% HCl. The bulk acid solution can be any suitable concentration of acid. Portions of the strong acid solution 432 can be transferred 492 to the weak acid solution 406 to maintain the pH of the weak acid solution 406, to maintain the volume of the weak acid solution 406, to maintain the specific gravity of the weak acid solution 406, or a combination thereof. Portions of the weak acid solution 406 can be removed 496 to maintain the pH and specific gravity of the weak acid solution 406. The removed portions of the weak acid solution 406 can be transferred 496 to a polyaluminum chloride tank 497. The polyaluminum chloride tank 497 can have, for example, a pH between approximately 1.5 and 2.5, and a specific gravity of approximately 1.3. The PAC tank 497 can also have, for example, a specific gravity of approximately 1.2-1.4. Gas from above the weak acid solution, which can include hydrogen ($H_2$), steam, and acid gas such as for example HCl gas, can be transferred 498 to a scrubber 499 to remove impurities before releasing into the environment. The head space above at least one of the medium acid solution, the strong acid solution, or the rinse solutions can be connected to the head space above the weak acid solution, such that the gas removed from the head space of the weak acid solution includes steam or gas originated from the weak acid solution and at least one of the medium acid solution, the strong acid solution, or the first or second rinse solutions.

The entire discussion of variables above regarding the three stage acid dissolution process also applies equally to the two stage acid dissolution process, or to a process with any number of dissolution or rinse stages. Thus, embodiments of the present invention, with one or two or more dissolution stages, and with one or two or more washing stages, encompass optionally transferring portions of fresh water or rinse water from any rinse stage to any solution to maintain or adjust the pH, volume, or specific gravity of that solution. The "strong" and "weak" designators are relative indicators, rather than being restrictive of a certain range of pH. The process can be performed with any number of tanks, including one. The transfers of the liquid can occur in a batch or continuous fashion. Any suitable value of pH or specific gravity for the stages is encompassed by embodiments of the present invention.

All publications, patents, and patent applications are incorporated herein by reference. While in the foregoing specification this disclosed subject matter has been described in relation to certain preferred embodiments thereof, and many details have been set forth for purposes of illustration, it will be apparent to those skilled in the art that the disclosed subject matter is susceptible to additional embodiments and that certain of the details described herein can be varied considerably without departing from the basic principles of the disclosed subject matter.

What is claimed is:

1. A method for increasing the purity of silicon, comprising:
combining a first silicon-aluminum complex with a first hydrochloric acid solution to allow the first complex to react at least partially with the first hydrochloric acid solution, to provide a first mixture;
separating the first mixture, to provide a third silicon-aluminum complex and the first hydrochloric acid solution;
combining the third silicon-aluminum complex with a second hydrochloric acid solution to allow the third complex to react at least partially with the second hydrochloric acid solution, to provide a third mixture, wherein the second hydrochloric acid solution is stronger than the first hydrochloric acid solution;
separating the third mixture, to provide a first silicon and the second hydrochloric acid solution;
transferring portions of the second hydrochloric acid solution to the first hydrochloric acid solution to maintain the pH of the first hydrochloric acid solution, the volume of the first hydrochloric acid solution, the specific gravity of the first hydrochloric acid solution, or a combination thereof;
combining the first silicon with a first rinse solution, to provide a fourth mixture;
separating the fourth mixture, to provide a wet purified silicon and the first rinse solution;
drying the wet purified silicon, sufficient to provide a dry purified silicon.

2. The method of claim 1, further comprising:
separating the first mixture, to provide a second silicon-aluminum complex and the first hydrochloric acid solution;
combining the second silicon-aluminum complex with a third hydrochloric acid solution to allow the second complex to react at least partially with the third hydrochloric acid solution, to provide a second mixture, wherein the third hydrochloric acid solution is stronger than the first hydrochloric acid solution, and wherein the third hydrochloric acid solution is weaker than the second hydrochloric acid solution;
separating the second mixture, to provide a third silicon-aluminum complex and the third hydrochloric acid solution.

3. The method of claim 1, further comprising:
separating the fourth mixture, to provide a second silicon and the first rinse solution;
combining the second silicon with a second rinse solution, to provide a fifth mixture;
separating the fifth mixture, to provide the wet silicon and the second rinse solution.

4. The method of claim 1, further comprising removing portions of the first hydrochloric acid solution from the first hydrochloric acid solution.

5. The method of claim 4, wherein the portions of the first hydrochloric acid solution are removed from the first hydrochloric acid solution when the pH of the first hydrochloric acid solution is equal to or greater than approximately 1.5 and when the specific gravity of the first hydrochloric acid solution is equal to or greater than approximately 1.3.

6. The method of claim 4, wherein the removed portions of the first hydrochloric acid solution comprise a product of the reaction of aluminum with at least one of hydrochloric acid or water, wherein the removed portions of the first hydrochloric acid solution comprise a product valuable for water treatment or purification, or a combination thereof.

7. The method of claim 4, wherein the removed portions of the first hydrochloric acid are transferred to a polyaluminum chloride tank, the tank comprising a settling tank with a pH of approximately 1.5 to 2.5 and a specific gravity of approximately 1.25 to 1.35, wherein the settling tank allows solid material in the tank to settle to the bottom for removal.

8. The method of claim 2, further comprising transferring portions of third hydrochloric acid solution to the first hydrochloric acid solution to maintain the pH of the first hydrochloric acid solution, the volume of the first hydrochloric acid solution, the specific gravity of the first hydrochloric acid solution, or a combination thereof.

9. The method of claim 1, wherein the first hydrochloric acid solution comprises hydrochloric acid with a pH of approximately 1.0-3.0 and a specific gravity of less than approximately 1.2-1.4.

10. The method of claim 1, wherein the dry purified silicon comprises approximately 1000-3000 parts per million weight aluminum.

11. The method of claim 2, further comprising transferring portions of the second hydrochloric acid solution to the third hydrochloric acid solution to maintain the pH of the third hydrochloric acid solution, the volume of the third hydrochloric acid solution, the specific gravity of the third hydrochloric acid solution, or a combination thereof.

12. The method of claim 2, wherein the third hydrochloric acid solution comprises hydrochloric acid with a pH of approximately 0.0 to 3.0 and a specific gravity of approximately 1.05-1.3.

13. The method of claim 1, further comprising transferring portions of the first rinse solution or of a bulk hydrochloric acid solution to the second hydrochloric acid solution to maintain the pH of the second hydrochloric acid solution, the volume of the second hydrochloric acid solution, the specific gravity of the second hydrochloric acid solution, or a combination thereof.

14. The method of claim 1, wherein the second hydrochloric acid solution comprises hydrochloric acid with a pH of approximately −0.5 to 0.0 and a specific gravity of approximately 1.01-1.15.

15. The method of claim 3, further comprising transferring portions of the second rinse solution to the first rinse solution to maintain the volume of the first rinse solution.

16. The method of claim 1, further comprising adding fresh water to the first rinse solution to maintain the volume of the first rinse solution.

17. The method of claim 3, further comprising adding fresh water to the second rinse solution to maintain the volume of the second rinse solution.

18. The method of claim 1, wherein at least one of the first, or third silicon-aluminum complex, the first silicon, the wet silicon, or the dry purified silicon are independently approximately 600 to 800 kg.

19. The method of claim 1, wherein the process is conducted in a batch or continuous fashion.

20. A method for increasing the purity of silicon, comprising:
   combining a first silicon-aluminum complex with a first hydrochloric acid solution to allow the first complex to react at least partially with the first hydrochloric acid solution, to provide a first mixture;
   separating the first mixture, to provide a third silicon-aluminum complex and the first hydrochloric acid solution;
   combining the third silicon-aluminum complex with a second hydrochloric acid solution to allow the third complex to react at least partially with the second hydrochloric acid solution, to provide a third mixture, wherein the second hydrochloric acid solution is stronger than the first hydrochloric acid solution;
   separating the third mixture, to provide a first silicon and the second hydrochloric acid solution;
   combining the first silicon with a first rinse solution, to provide a fourth mixture;
   separating the fourth mixture, to provide a wet purified silicon and the first rinse solution;
   drying the wet purified silicon, sufficient to provide a dry purified silicon;
   removing portions of the first hydrochloric acid solution from the first hydrochloric acid solution to maintain the pH and specific gravity of the first hydrochloric acid solution;
   transferring portions of the second hydrochloric acid solution to the first hydrochloric acid solution to maintain the pH of the first hydrochloric acid solution, the volume of the first hydrochloric acid solution, the specific gravity of the third hydrochloric acid solution, or a combination thereof, wherein the third hydrochloric acid solution is stronger than the first hydrochloric acid solution, and wherein the third hydrochloric acid solution is weaker than the second hydrochloric acid solution;
   adding portions of a bulk hydrochloric acid solution to the second hydrochloric acid solution to maintain the pH of the second hydrochloric acid solution, the volume of the second hydrochloric acid solution, the specific gravity of the second hydrochloric acid solution, or a combination thereof;
   transferring portions of the first rinse solution to the second hydrochloric acid solution to maintain the pH of the second hydrochloric acid solution, the volume of the second hydrochloric acid solution, the specific gravity of the second hydrochloric acid solution, or a combination thereof; and
   adding fresh water to the second rinse solution to maintain the volume of the second rinse solution;
   wherein the dry purified silicon comprises approximately 1000-3000 parts per million weight aluminum.

21. The method of claim 20, wherein the process is conducted in a batch or continuous fashion.

* * * * *